United States Patent Office 3,390,109
Patented June 25, 1968

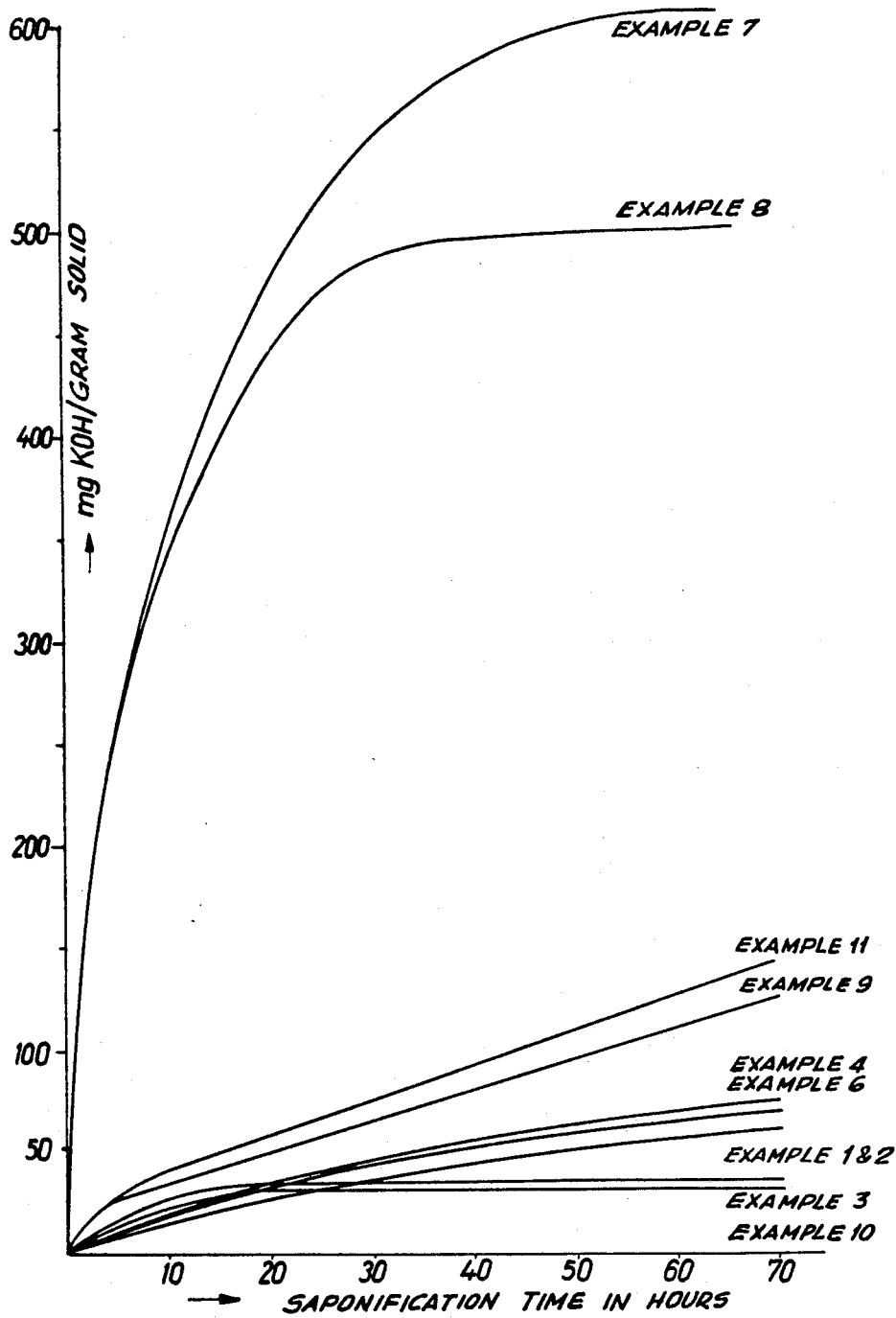

3,390,109
ALKALI STABLE TERPOLYMER COMPOSITIONS AND PROCESS FOR THEIR MANUFACTURE
André P. Reverdin, Basel, Paul Wicht, Freiburg, and Kurt Volken, Basel, Switzerland, assignors to Lonza Ltd., Gampel, Valais, Switzerland
Filed June 1, 1965, Ser. No. 460,082
Claims priority, application Switzerland, June 2, 1964, 7,186/64
16 Claims. (Cl. 260—17)

ABSTRACT OF THE DISCLOSURE

Aqueous resin dispersion, of pH between 3 and 5, which is resistant to saponification. The resin dispersion comprises a terpolymer from a component A, which is vinyl chloride, in the proportion between 20 and 40%, a component B, which is a vinyl ester with 1 to 3 carbon atoms in the acid radical, in the proportion between 20 and 50%, and a component C, which has the general structure $$R_1CH=CR_2COOR_3$$

in which $R_1=H$ or $COOR_3$, $R_2=H$ or $CH_3$, $R_3=$alkyl group with 4 to 8 carbon atoms in the proportion between 25 and 50%, a nonionic protective colloid, in the proportion between 2 and 6%, a nonionic surface-active agent in the proportion between 0.1 and 3%, the combined amount of said colloid and said surface-active agent being between 2.5 and 8% of the combined weight of the polymers, and a buffering agent, in the amount of 0.3 to 0.5%, the weight percent of said colloid, said surface-active agent and said buffering agent being based on the weight of the terpolymer. The aqueous resin dispersions are suitable for use  binders and binding agents for pigments, dyes and fillers.

This invention relates to aqueous dispersions of resins and more specifically to dispersions which are resistant to saponification and which have high binding capacity as dispersing agents.

Resin dispersions find application in many fields, such as pigments and dyes, in connection with hydraulic binding agents, cement products, in the textile industry for textile finishings and in the paper industry, for imparting stiffness to paper. For instance, aqueous resin dispersions are incorporated into building materials, such as concrete, and as binding agents into paint compositions. When incorporated into building materials, which are to remain dry, these dispersions improve the physical properties of the cementitious compositions, mainly the resistance to torsion, stresses, impact, abrasion, and in general the strength, stability and cohesiveness of the compositions. Also, when incorporated into paints, which are used exclusively as interior paints, or only exposed to a dry atmosphere, the paints exhibit improved resistance to cracks, and have greater adhesive stability. On the other hand, the resin dispersions known in the art, are far from satisfactory, when incorporated into outdoor paints, which are exposed to moisture and variable weather conditions.

The main drawback of polyvinyl esters, for instance polyvinyl acetate, is that they are not stable to alkali. Dispersions containing polyvinyl esters, as well as the films prepared from them, are fairly easily hydrolized under the action of alkali and water. When dispersions containing a polyvinyl ester, are incorporated into cementitious materials, for instance concrete, or as binding agents for paint formulations, the improvements mentioned above with respect to tenacity, cohesiveness and in general, the physical properties of the cementitious materials, are lost, under the action of water or on exposure to a moist atmosphere. Also, if the paint fomulation is used as a primer coat on a backing which is basic, because of the presence of limestone, for instance concrete, the combined action of the moisture and of the basic material, causes saponification of the polyvinyl acetate present in the paint as binder, with resulting loss of the stability of the paint.

Many efforts have been made to prepare resin dispersions with high binding capacity and stable to alkali. Some improvement has been achieved with the dispersions which contain copolymers, for instance vinyl acetate-vinyl laurate, vinyl-esters and acrylic esters, because of their greater stability to alkali, as compared with the dispersions of polyvinyl acetate. Also these dispersions, however, are not satisfactory as binders for paints, for incorporation into concrete, or into any other basic building material, because they cannot stand frequent, prolonged and strong action of moisture, but are saponified, and the initial improvements in adhesion stability of the paint and of the building material are essentially lost.

Dispersions of copolymers from vinyl chloride and vinyl esters have been investigated for this purpose but have limited application. Although the alkali stability increases with increasing proportion of vinyl chloride, their binding capacity is poor and the resulting building materials and paint formulations have poor cohesion. Another drawback is that film formation from the dispersions occurs only at high temperatures, and their use as additives in concrete materials or as binders in paint formulations of exterior work, is very limited.

One object of this invention is to provide aqueous dispersions of resins which are superior to other dispersions known in the art, for their resistance to saponification and their high binding capacity, for use in hydraulic binders and binding agents for pigments, dyes and fillers. Another object is to provide dispersions which yield films at low temperature, and which are stable at low temperature, even below 0° C. Another object is to provide a process for the preparation of the aqueous resin dispersions of this invention, which is economical and suitable for commercial sale.

These and other objects will appear hereinafter from the description which follows.

The crux of the instant invention resides in the finding that the above-stated advantages may be achieved by preparing the dispersions from terpolymers which comprise between 20 and 40% by weight of component A, which is vinyl chloride, between 20 and 50% by weight of component B, which is a vinyl ester containing between 1 and 3 carbon atoms in the acid radical, and between 25 and 50% by weight of a component C, which has the general formula $$R_1CH=CR_2COOR_3$$

in which $R_1=H$ or $COOR_3$, $R_2=H$ or $CH_3$, and $R_3=$alkyl group with 4 to 8 carbon atoms.

It is essential, within the scope of this invention, to prepare the terpolymer in water in the presence of a nonionic protective colloid, the latter being used in the amount between 2 and 6% of the combined weight of the monomers, and in the presence of a buffering agent, such as secondary sodium phosphate, to keep the pH of the mixture, at the beginning at the polymerization, in the range of 4.5 to 5 and at the end of the polymerization, at 3 or higher.

It is also recommended to add a nonionic surface active agent or emulsifier, in amount between 0.1 and 3% of the combined weight of monomers, and with a catalyst for the polymerization reaction. 

In accordance with a preferred embodiment of the invention, the concentration of the vinyl chloride is kept at between 25 and 35%, the concentration of vinyl ester at between 25 and 40%, and the concentration of the protective colloid at between 3 and 5%. It is also advantageous to have a plasticizer in the proportion between 2 and 3% by weight of the combined weight of the monomer.

As component B, that is, the vinyl ester, vinyl acetate is preferably used.

As component C, that is, the compound of formula $R_1CH=CR_2COOR_3$, acrylic esters, such as butyl acrylate, may be advantageously used. Also the esters of methacrylic acid or of maleic or fumaric acid, or 2-ethyl is preferably used.

As a plasticizer, any of the known neutral plasticizers, which are compatible with the resins and act as solvents by maintaining the resins in dispersion, may be used, such as, for instance, dibutyl phthalate, esters of citric acid, neutral phosphoric acid esters, and glycolic esters.

As already mentioned above, the polymerization reaction within the scope of the invention, takes place in an aqueous dispersion, and the presence of the protective colloid material is essential. As protective colloid substances, only nonionic water-soluble substances may be used, such as, for instance, polyvinyl alcohol, hydroxymethylcellulose, hydroxyethyl cellulose and poly N-vinylpyrrolidone. Polyvinyl alcohol is very satisfactory.

As nonionic surface active agents or emulsifiers, there may be used the condensation products of ethylene oxide, ethanolamine, or sorbitol with fatty acids, tall oil, alkyl-phenols, fatty acid amides, and with aliphatic alcohols. Very suitable, within the scope of the invention, is the condensation product of ethylene oxide with nonyl-phenol, which has an ethylene oxide content of 55 to 65%.

The combined amount of protective colloid and surface-active agent, within the scope of the invention, is between 2.5 and 8%, preferably between 3.5 and 7%, based on the combined amount of monomers, with the quantity of surface-active agent being kept between 0.1 and 3%.

For the purpose of obtaining the terpolymer in the desirable particle size, it is preferable to prepare first a master latex of polyvinyl ester, that is an emulsion of polyvinyl ester in water, and then to allow the polymerization of the three monomers to proceed on the preformed latex. Although the solid content of the latex is not crucial, it is preferred to prepare a latex with a solid content of polyvinyl ester of between 5 and 10%, calculated on the combined weight of the monomers.

As polymerization catalysts or accelerators, there are used the water soluble catalysts which are known to catalyze free radical reactions, such as, for instance, peroxides and persulfates. Alkalipersulfates are satisfactory. The polymerization reaction is conveniently conducted at a temperature between 60° and 70° C.

For the purpose of better illustrating the invention, the following examples are described in detail hereinbelow.

Example 1

In a stainless steel, double-jacketed, two-liter autoclave, provided with mechanical stirrer, thermometer and feed reservoir, were placed 570 grams of soft water, 30 grams of 100% polyvinyl alcohol, 6 grams of the condensation product of ethylene oxide and nonylphenol, of 63% ethylene oxide content, 1.5 gram of sodium acetate, 3 grams of disodium phosphate, and 2 grams of potassium persulfate. The polyvinyl alcohol had a saponification number of 125–140, and the viscosity of a 4% solution, at 20° C., was 30–40 centipoises.

The autoclave was closed, flushed with nitrogen and evacuated. Through the feed reservoir, a mixture of 180 grams of vinyl chloride, 180 grams of vinyl acetate, 240 grams of butyl acrylate, and 12 grams of dibutyl phthalate as a plasticizer, was gradually added. After the addition of about 50 grams of the monomer mixture, the autoclave was warmed to 65° to 70° C. under agitation. The pressure rose to 1.5 atmospheres at 60° C. As soon as polymerization began, at 65° C., a pressure drop was observed. The remainder of the monomer mixture was then added, at such rate that the pressure never rose above 3 atmospheres. The total addition required 4 hours. The reaction mixture was kept under agitation an additional period of 2 hours at 70° C. After blowing air through to remove the last traces of unreacted monomers, the pH was adjusted to 5, by addition of a 5% sodium carbonate solution and the reaction product was cooled.

Example 2

In a stainless steel, double-jacketed, 4000-liter autoclave, provided with anchor-shaped stirrer, thermometer and manometer, were placed 1150 kg. of soft water, 50 kg. of 100% polyvinyl alcohol, 12 kg. of the condensation product of ethylene oxide and nonyl phenol, with 63% ethylene oxide content, 6 kg. of disodium phosphate dodecahydrate ($Na_2HPO \cdot 12 H_2O$), and 3 kg. of potassium persulfate. The autoclave was connected with a pressure tank. After flushing the appartus with nitrogen and evacuating, 60 kg. of vinyl acetate were added for the formation of the polyvinyl acetate latex. The autoclave was then closed and warmed to 65°–70° C. The pressure at first rose, to about 0.5 atmosphere, at 60° C., then dropped as soon as polymerization began. After the pressure dropped to 0.2 atmosphere, a mixture of 360 kg. of vinyl chloride, 360 kg. vinyl acetate, 480 kg. of butyl acrylate, and 24 kg. of dibutyl phthalate was added, gradually, at such rate that the pressure did not rise about 3.5 to 4 atmospheres. The addition of the monomer mixture was complete in a period of 2 to 3 hours. The reaction mixture was kept one hour longer at 70° C., under agitation, until the pressure dropped to 0.5 atmosphere. After blowing air through to remove the last traces of unreacted monomers, the pH was adjusted to 5 with 5% sodium carbonate solution and the reaction product was cooled.

Example 3

The polymerization of 200 grams of vinyl chloride, 200 grams of vinyl acetate, 200 grams of 2-ethyl 1-hexyl acrylate, was carried out in the presence of 6 grams of dibutyl phthalate, as in Example 1, except that a latex of polyvinyl acetate was prepared first, as in Example 2, from 30 grams of vinyl acetate, corresponding to 5% of the combined weight of the monomers.

Example 4

The polymerization was carried out as in Example 3, from a monomer mixture consisting of 180 g. vinyl chloride, 180 g. vinyl acetate, 240 g. of dibutyl maleate and 12 g. of dibutyl phthalate, as a plasticizer.

Example 5

The polymerization was carried out as in Example 3, from a monomer mixture consisting of 154 g. of vinyl chloride, 210 g. vinyl acetate, 236 g. butyl acrylate, and 12 g. of dibutyl phthalate as a plasticizer.

Example 6

The polymerization was conducted under the same conditions as in Example 3, except that instead of polyvinyl alcohol, a total of 18 grams of hydroxyethylcellulose was used. The monomer mixture consisted of 180 grams vinyl chloride, 180 grams vinyl acetate, 240 grams butyl acrylate and 12 grams dibutyl phthalate.

The aqueous resin dispersions containing the terpolymer compositions prepared as described in Examples 1 through 6, were free from clots, and showed no tendency to coagulate. They exhibited remarkable stability to electrolytes, and to storage, even at low temperature, in the range of −10° to −20° C. They exhibited good resistance to alkali, and film formation from the dispersions occurred even at very low temperatures. The dispersions were compatible with hydraulic binding agents, a property necessary for incorporation into cement materials and concrete. Further, the dispersions prepared as described above, exhibited good binding capacity, a property necessary for use as binders in pigments and fillers. The films prepared from the dispersions of this invention were superior to other films known in the art, for their high tensile strength and high stretchability, in the order of 300 to 700%. The films exhibited excellent adhesion characteristics and high resistance to wet abrasion, both in combination with pigments and with fillers. When incorporated into cement mixtures, for instance concrete, the resulting materials were outstanding for their high resistance to torsion, flexure and to compression forces, and resistance to the action of moisture. These characteristics were not essentially affected by immersion in water.

In order to compare the properties of the dispersions of the terpolymers prepared in accordance with this invention, with other dispersions known in the art, other dispersions were prepared and a series of tests were performed, as it will be described hereinbelow. Example 7 in the tests which follow, represents the dispersion from one single ingredient, that is polyvinylacetate. Example 8 represents the dispersion from vinylacetate and 2-ethylhexyl-acrylate, in the ratio of 80 to 20% by weight. Example 9 is the dispersion from vinyl acetate and vinyl chloride, in the ratio of 80 to 20% by weight, and Example 10 is a dispersion of vinyl acetate and vinyl chloride in the ratio of 50 to 50% by weight.

The preparation of the dispersions in Examples 7 to 10 was conducted according to the procedure described in Example 3. Example 11 in the tests is a commercial preparation of the dispersion from vinyl propionate and ethyl acrylate. Table 1 shows the results of several comparative tests between the dispersions of Examples 7 to 11, and the dispersions prepared according to this invention, Examples 1 through 6.

1.5 N potassium hydroxide. The amount of potassium hydroxide used was determined after each time interval. The results tabulated in Table 1 show the superiority in resistance to saponification of the dispersions prepared in accordance with this invention in Examples 1 through 6, as compared particularly with the dispersions of Examples 7, 8, that is, pure polyvinylacetate and the dispersions from vinylacetate and 2-ethylhexyl acrylate, which are of little value for incorporation into cement compositions and paint formulations.

The dispersions prepared from the copolymers of vinyl acetate and vinyl chloride, that is the materials from Examples 9 and 10, although more stable to alkali, are of little use for incorporation into concrete and other cementitious materials and as binders in pigments and filler compositions, because of the high temperature of film formation, poor stretchability (less than 1), and poor cohesiveness.

The dispersion prepared from the copolymers of vinyl propionate and acrylic esters, that is Example 11, exhibits low resistance to tearing, that is the tensile strength is only 8.

In order to determine the suitability of the dispersions prepared in accordance with this invention, for incorporation into plasters, mortar, hydraulic cements and outdoor paints, that is, in general in material which is to be exposed to moisture of the atmosphere and rain, the cohesiveness of plaster and hydraulic cements having a basic composition, under water, was determined. Table 2 gives the results with the dispersions prepared according to this invention, that is Examples 1 through 6, and other dispersions known in the art, that is Examples 7, 9, 10 and 11.

The test was conducted by mixing one gram of the cement and 3 grams of sand, of particle size between 0 and 1 mm., with water and each of the dispersions under

TABLE 1

| Example No | 1 | 2 | 3 | 4 | 5 | 6 | 7 | 8 | 9 | 10 | 11 |
|---|---|---|---|---|---|---|---|---|---|---|---|
| Solid content in percent | 53 | 53 | 54 | 51 | 55 | 50 | 50 | 50 | 51 | 50 | 50 |
| Viscosity in poises (Brookfield viscometer 10 t./min.) | 80–120 | 145 | 100 | | 110 | 240 | | | | | 85 |
| Particle size in μ | 0.3–3 | 0.3–30 | 5–2.5 | 0.5–2 | 0.3–2 | 1.5–2 | 0.5–3 | 0.2–2 | 1–3 | 1–3 | 0.2–3 |
| Resistance to freezing in °C | −20 | −20 | −20 | −20 | −20 | −20 | −10 to −20 | −10 | −10 | −10 | −10 |
| Stability to alkali in mgs. of KOH used per gram of solid material after— | | | | | | | | | | | |
| 24 hours | 30 | 29 | 34 | 40 | 30 | 35 | 510 | 465 | 55 | 30 | 62.5 |
| 48 hours | 47.5 | 48 | 35 | 60 | 60 | 59 | 600 | 500 | 79 | 30 | 105 |
| 72 hours | 60 | 59 | 34 | 74 | 66 | 67 | 600 | 500 | 127 | 30 | 143 |
| Temperature of film formation in °C | 8 | 9 | 10 | 15 | 4 | 10 | 20–25 | 10 | 35–60 | 60 | 8 |
| Tensile strength in kg./cm.², with 65% atmospheric moisture, at 20°C | 75 | 70 | 140 | 100 | 70 | 67 | 350–400 | 40 | 250 | 320 | 8 |
| Stretchability, in percent, with 65% atmospheric moisture, at 20°C | 650 | 610 | 400 | 330 | 620 | 620 | 10 | 700 | <1 | <1 | 900 |

The rate of saponification was determined by placing 100 grams of the dispersion under test in a flask, with 500 milliliters of 2 N potassium hydroxide solution, mixing, closing the flask and keeping the material under agitation at 25° C., for a predetermined period of time. The alkali concentration of the material corresponded to test, as a 50% dispersion based upon the total solid content, was added. The composition was placed as a layer, 3 mm. thick, over a backing of glass or roofing material, for instance known in the trade as Eternit. The amount of the dispersion added was 5% in the case of glass and 10% in the case of Eternit. After drying in the air for three days, the samples were placed under water.

TABLE 2.—STABILITY OF HYDRAULIC CEMENTS. CONTAINING DISPERSIONS FROM EXAMPLES 1 THROUGH 6, 7, 9 THROUGH 11, OVER GLASS AND ETERNIT

| | Cohesion Stability | | |
|---|---|---|---|
| | After drying | After standing in water, 24 hours | After standing in water for 2 months |
| Dispersions prepared according to Examples 1, 2, 3, 4, 5, and 6. | Very good | Very good | Very good. |
| Polyvinyl acetate dispersion prepared according to Example 7. | do | Very poor; cement dissolved by the base material. | |
| Dispersing from the copolymer of vinyl acetate and vinyl chloride, according to Examples 9 and 10. | Poor | Poor; cement dissolved by the base material. | |
| Copolymer dispersion of vinyl propionate and ethyl acrylate according to Example 11. | Very good | Good | Average. |

It is manifest from the data of Table 2, that cementitious materials, essentially basic because of the presence of limestone, are stable, even for a period of two months, under water, if the dispersions prepared in accordance with this invention, are used. On the other hand, the dispersions of Examples 7, 9, 10 and 11 cause the material to be dissolved, even in the course of 24 hours.

Similar results were obtained when the dispersions of the invention were used as binders in paints, pigments and in filler compositions, containing for instance, sand. In each instance, the paints, pigments and filler compositions were not affected and did not go in solution on prolonged standing in water, even on a smooth surface, such as glass or Eternit.

For the purpose of determining the resistance to water corrosion of films containing pigments, several tests were conducted, designed to compare the resistance to water corrosion and binding capacity of the dispersions prepared according to this instant invention, and dispersions known in the art. The tests were conducted by letting a film to form over the base material, Eternit, spraying with a solution of 5% soft soap and 1% sodium carbonate and simultaneously moving a brush back and forth over the surface of the film. Table 3 below, gives the results with the dispersions according to the instant invention, namely Examples 1, 2, 5 and 6, and with the dispersions known in the art, that is Examples 7, 8 and 11.

Tests were also conducted to determine the resistance to torsion forces of the hydraulic cements incorporating the dispersions of the invention, as compared with other dispersions known in the art. The tests were conducted by mixing 1 gram of Portland cement and 3 grams of sand, of grade between 0 and 5 mm., with water, adding the resin dispersion, under test, as a 50% dispersion, based upon the total solid content, and forming prisms of dimensions 2 x 4 x 16 mm. The resistance to torsion was determined (1) after a 28-day period standing in the air, of 65% moisture content, (2) after an additional 1-day period standing in water and (3) after an additional 7-day period standing in water. The results in resistance to torsion forces of several hydraulic cements are listed in Table 4. A control of an hydraulic cement, without resin dispersion is also shown.

TABLE 4.—RESISTANCE TO TORSION OF HYDRAULIC CEMENTS CONTAINING RESIN DISPERSIONS

| | Dispersion in percent by weight | Water to cement factor | Resistance to Torsion | | |
|---|---|---|---|---|---|
| | | | 28-day standing in an atmosphere of 65% moisture content | +one day standing in water | +seven-day standing in water |
| Without addition of dispersion | | 0.44 | 77 | 56 | 55 |
| Dispersion according to Example 1 | 1 | 0.39 | 70 | 60 | 68 |
| | 5 | 0.36 | 95 | 65 | 70 |
| | 10 | 0.37 | 105 | 85 | 85 |
| Dispersion according to Example 2 | 5 | 0.36 | 91 | 60 | 72 |
| Dispersion according to Example 3 | 5 | 0.36 | 80 | 40 | 45 |
| Dispersion according to Example 4 | 5 | 0.36 | 90 | 37.5 | 47 |
| Dispersion according to Example 5 | 5 | 0.344 | 130 | 110 | 80 |
| Dispersion according to Example 6 | 5 | 0.47 | 76.5 | 47.6 | 80 |
| Dispersion according to Example 7 | 5 | 0.41 | 110 | 25 | <10 |
| According to Example 8, with vinyl acetate and 2-ethylhexylacrylate in the ratio of 80 to 20 | 5 | 0.37 | 62 | 8 | |
| According to Example 11, with vinyl propionate and ethyl acrylate | 5 | 0.396 | 83.9 | 35.4 | 37.6 |

It is clear from the results above, that the hydraulic cements incorporating the resin dispersions according to this invention, for instance Examples 1 and 2, are far superior in resistance to torsion, even after a 7-day period of standing in water, than the cements which incorporate the polyvinyl acetate dispersion (Example 7) or the dispersions according to Examples 8 and 11. The material which incorporates the dispersion from Example 8 is not resistant to torsion even after merely 1-day standing in water.

TABLE 3.—RESISTANCE TO WATER CORROSION OF FILMS APPLIED AS COATINGS OVER A BASE OF ETERNIT, WITH DIFFERENT RATIO OF PIGMENT TO BINDER (Determination according to Dr. Oesterle test)

| Dispersion | Ratio of pigment to binder | Number of strokes of brush |
|---|---|---|
| According to Examples 1 and 2 | 4:1 | After 5,000, perfect, untouched. |
| | 6:1 | Do. |
| | 8:1 | After 1,500, corrosion occurs. |
| According to Examples 5 and 6 | 4:1 | After 2,000, perfect, untouched. |
| Dispersion from polyvinyl acetate with 12% dibutyl phthalate and 8% tricresyl phosphate, according to Example 7. | 4:1 | After 920, corrosion occurs. |
| Dispersion prepared according to Example 8, that is from vinyl acetate and 2-ethylhexylacrylate, in the ratio of 80 to 20 | 4:1 | After 1,200, corrosion occurs. |
| Dispersion prepared from vinyl-propionate and ethyl acrylate, according to Example 11. | 4:1 | After 5,000, perfect, untouched. |
| | 6:1 | After 2,200, corrosion occurs. |
| | 8:1 | After 400, corrosion occurs. |

Comparison of the results obtained with Examples 1 and 2 with the results from Example 11, clearly shows that the dispersions prepared according to this instant invention, permit the incorporation of pigment and binder in a higher ratio than with the dispersions known in the art. Manifestly, the binding capacity of the dispersions of the invention is superior to the dispersion, for instance, from vinyl propionate and ethyl acrylate. It is also clear from the results above that the films prepared from the dispersions of the instant invention, have superior resistance to water corrosion.

Tests were also conducted to determine the compression strength of mortar and hydraulic cements, incorporating resin dispersions, both in dry conditions and under water. The tests were conducted similarly to the tests reported in Table 4, from prisms of cements, of dimensions 4 x 4 x 2 cm. The prisms were placed in a press, between steel plates of 4 x 4 cm. size, with force being applied perpendicularly to the larger 4 x 4 surface of the prisms. The force necessary to compress the prisms was measured. The results are reported in Table 5, below.

The table also gives the results with a sample of hydraulic cement to which no resin dispersion was added, as a control.

TABLE 5.—COMPRESSION STRENGTH OF HYDRAULIC CEMENTS INCORPORATING DIFFERENT RESIN DISPERSIONS

|  | Water cement factor | Compression strength in kg./cm.³ | |
|---|---|---|---|
|  |  | 28-day standing in an atmosphere of 65% moisture content | 28-day standing in water |
| Control: without resin addition | 0.48 | 443 | 598 |
| With 5% of the dispersion according to Example 1 | 0.38 | 569 | 500 |
| With 5% of the dispersion according to Example 2 and 0.1% of Nopco NXZ* as an antifoaming agent | 0.38 | 606 | 593 |
| With 5% dispersion according to Example 11 | 0.434 | 284 | 171.5 |

*Nopco NXZ is a blend of mixed hydrocarbons, nonionic emulsifiers, metallic soap and silicone.

Manifestly the results wtih the dispersions according to Examples 1 and 2 show that the hydraulic cements are far more resistant to compression force than the cement incorporating the resin dispersion according to Example 11. Also, the results obtained after a 28-day period standing in water, undisputably show the superiority of the resin dispersions prepared according to this instant invention, over the dispersions known in the art.

It may be advantageous, in the incorporation of the resin dispersions into the cements, to add a small amount of an anti-foaming agent, in an amount between 0.05 and 0.5%, by weight.

The dispersions prepared according to this instant invention, because of their high binding capacity, are outstanding as binders for water-proof dyes and for the preparation of friction compositions, for instance for matches, which comprise a dispersion and a filler, such as sand. They are of great value for incorporation into cement compositions, concrete, for the preparation of new special plasters and mortars, and for improving the properties of known concrete, light-weight building compositions, paints and flooring.

In addition, to the above, the dispersions prepared according to this instant invention, find application as substitutes for the dispersions known in the art, and for all other uses of the known dispersions, with plasticizers, pigments and dyes, for instance for the preparation of textile finishings, in the paper industry, floor coverings and seat covers.

Although only a few applications of the invention have been described in detail, and only a few examples have been set forth for the purpose of greater clarification, those skilled in the art will readily visualize that many other modifications and variations are possible, without departing from the spirit of the invention, which is to be limited only by the scope of the appended claims.

The date of saponification as a function of time for the compositions prepared according to this instant invention and the composition known in the art have been plotted in FIG. 1. The curves for Examples 1 through 6 are strikingly different than the curves for Examples 7 and 8.

What is claimed is:

1. An aqueous resin dispersion, of pH between 3 and 5, resistant to saponification, comprising a terpolymer from a component A, which is vinyl chloride, in the proportion between 20 and 40%, a component B, which is a vinyl ester with 1 to 3 carbon atoms in the acid radical, in the proportion between 20 and 50%, and a component C, which has the general structure $$R_1CH=CR_2COOR_3$$

in which $R_1=H$ or $COOR_3$, $R_2=H$ or $CH_3$, $R_3=$alkyl group with 4 to 8 carbon atoms, in the proportion between 25 and 50%, a nonionic protective colloid, in the proportion between 2 and 6%, a nonionic surface-active agent in the proportion between 0.1 and 3%, the combined amount of said colloid and said surface-active agent being between 2.5 and 8% of the combined weight of the polymers, and a buffering agent, in the amount of 0.3 to 0.5%, the weight percent of said colloid, surface-active agent and said buffering agent being based on the weight of the terpolymer.

2. The dispersions according to claim 1, wherein vinyl chloride is in the proportion between 25 and 35%, the component B is in the proportion of 25 to 40%, the protective colloid is in the proportion of 3 to 5%, the combined amount of the surface-active agent and of the colloid being between 3.5 and 7% of the weight of the terpolymer, additionally comprising a neutral plasticizer which is compatible with said terpolymer, in amount of 2 to 3% of the weight of the terpolymer.

3. The dispersion according to claim 1, wherein said buffering agent is disodium phosphate in the amount of 0.3 to 0.5% of the weight of the terpolymer.

4. The dispersion according to claim 1 wherein said component B is vinyl acetate, said component C is a member selected from the group consisting of butyl acrylate, 2-ethyl 1-hexyl acrylate, esters of methacrylic, maleic, and fumaric acid, and said protective colloid is a nonionic water-soluble substance, selected from the group consisting of polyvinyl alcohol, hydroxymethyl cellulose, poly-N-vinyl pyrrolidone and hydroxyethyl cellulose.

5. The dispersion according to claim 2 wherein said plasticizer is a member selected from the group consisting of dibutyl phthalate, neutral phosphoric acid esters, glycolic esters and citric acid esters.

6. The dispersion according to claim 1 wherein said surface-active agent is a condensation product of a member selected from the group consisting of ethylene oxide, ethanolamine and sorbitol with a member selected from the group consisting of fatty acids, tall oil, alkylphenols, fatty acid amides, and aliphatic alcohols.

7. The dispersion according to claim 6 wherein said surface-active agent is the condensation product of ethylene oxide and nonyl phenol, which has 55 to 65% ethylene oxide content.

8. The process of preparing an alkali-resistant aqueous dispersion of a terpolymer which comprises the steps of polymerizing between 20 and 40% of a component A, which is vinyl chloride, with 20 to 50% of a component B, which is a vinyl ester with 1 to 3 carbon atoms in the acid radical, and with 25 to 50% of a component C, which has general formula $$R_1CH=CR_2COOR_3$$

in which $R_1=H$ or $COOR_3$, $R_2=H$ or $CH_3$, $R_3=$an alkyl group with 4 to 8 carbon atoms in water, in the presence of 2 to 6% by weight of a protective colloid, between 0.1 and 3% of a nonionic surface-active agent, a catalyst of the free radical type, and a buffering agent in amount sufficient to keep the pH at 3 to 5 at the beginning of the polymerization and above 3 at the end thereof, whereby an aqueous dispersion of said terpolymer is formed, adjusting the pH to 5 and cooling said reaction product.

9. The process according to claim 8 wherein a latex of polyvinyl acetate is formed, prior to said step of polymerization.

10. The process according to claim 9 wherein said latex contains between 5 and 10% of polyvinyl acetate.

11. The process according to claim 8 wherein said polymerization is conducted at 60° to 70° C.

12. The process according to claim 8 wherein the pressure is maintained below 4 atmospheres during said polymerization.

13. The method of imparting to hydraulic binding materials high resistance to torsion and stability in water and alkali, which comprises incorporating into said materials between 5 and 10% of a 50% aqueous dispersion which comprises a terpolymer from a component A, which is vinyl chloride, in the proportion between 20 and 40%, a component B, which is a vinyl ester with 1 to 3 carbon atoms in the acid radical, in the proportion between 20 and 50%, and a component C, which has the general structure $$R_1CH=CR_2COOR_3$$

in which $R_1$=H or $COOR_3$, $R_2$=H or $CH_3$, $R_3$=alkyl group with 4 to 8 carbon atoms in the proportion between 25 and 50%, a nonionic protective colloid, in the proportion between 2 and 6%, a nonionic surface-active agent in the proportion between 0.1 and 3%, the combined amount of said colloid and said surface-active agent being between 2.5 and 8% of the combined weight of the polymers, and a buffering agent, in the amount of 0.3 to 0.5%, the weight percent of said colloid, said surface-active agent and said buffering agent being based on the weight of the terpolymer.

14. The method according to claim 13 in which an antifoaming agent is added in the proportion of 0.05 and 0.5%.

15. The method of imparting stability to alkali and high cohesiveness to emulsion paint formulations containing pigments, which comprises incorporating into said formulations a binder which is an aqueous dispersion which comprises a terpolymer from component A, which is vinyl chloride, in the proportion between 20 and 40%, a component B, which is a vinyl ester with 1 to 3 carbon atoms in the acid radical, in the proportion between 20 and 50%, and a component C, which has the general structure $$R_1CH=CR_2COOR_3$$

in which $R_1$=H or $COOR_3$, $R_2$=H or $CH_3$, $R_3$=alkyl group with 4 to 8 carbon atoms in the proportion between 25 and 50%, a nanionic protective colloid, in the proportion between 2 and 6%, a nonionic surface-active agent in the proportion between 0.1 and 3%, the combined amount of said colloid and said surface-active agent being between 2.5 and 8% of the combined weight of the polymers, and a buffering agent, in the amount of 0.3 to 0.5%, the weight percent of said colloid, said surface-active agent and said buffering agent being based on the weight of the terpolymer, the proportion of said pigments to said binder being between 4:1 and 8:1.

16. An aqueous resin dispersion essentially consisting of
(1) a terpolymer from
 (A) about 20-40% by weight of vinylchloride,
 (B) about 20-50% by weight of a vinyl ester with 1-3 carbon atoms in the acid radical,
 (C) 25-50% by weight of a compound of the formula $$R_1CH=CR_2-COOR_2$$

wherein $R_1$=H or $COOR_2$, $R_2$=H or $CH_3$ and, $R_3$=alkyl of 4-8 carbon atoms
(2) 2-6% by weight, calculated on the amount of the terpolymer, of a nonionic protective colloid
(3) 0.5-2% by weight, calculated on the amount of the terpolymer, of a nonionic emulsifier and
(4) a pH buffering agent in an amount sufficient to adjust the pH of the dispersion to a value of between about 3-5.

No references cited.

WILLIAM H. SHORT, *Primary Examiner.*

J. NORRIS, *Assistant Examiner.*